April 24, 1962     A. A. RUBBRA     3,031,128
GAS-TURBINE ENGINE WITH CONTROLLABLE AIR TAPPING MEANS
Filed Nov. 18, 1957     2 Sheets-Sheet 2

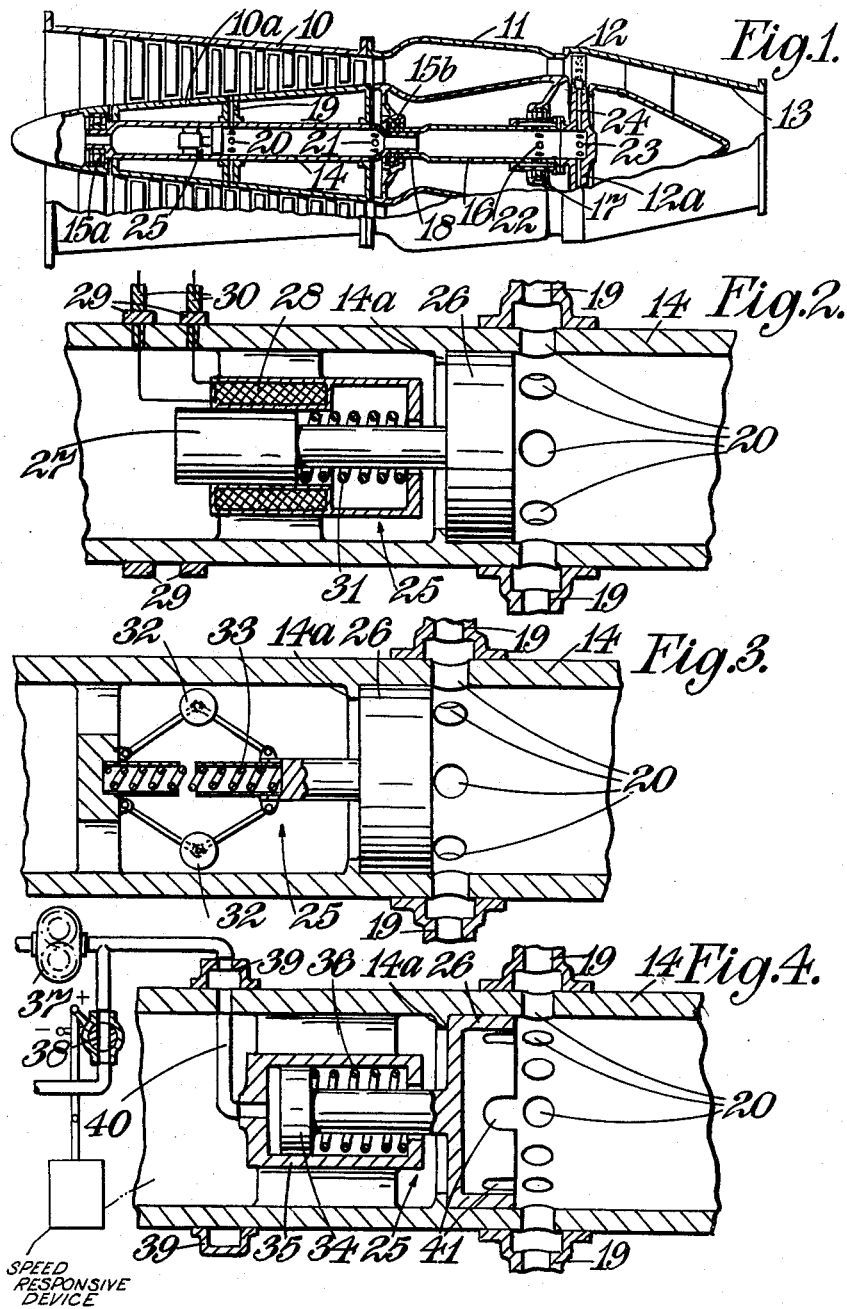

Inventor
A. A. Rubbra
By Mackinney & Mackinney
Attys.

3,031,128
GAS-TURBINE ENGINE WITH CONTROLLABLE AIR TAPPING MEANS

Arthur Alexander Rubbra, Derby, England, assignor to Rolls-Royce Limited, Derby, England, a British company
Filed Nov. 18, 1957, Ser. No. 697,069
Claims priority, application Great Britain Nov. 23, 1956
10 Claims. (Cl. 230—116)

This invention comprises improvements in or relating to gas-turbine engines.

It is known, for instance from British patent specification No. 622,181 (Rolls-Royce Limited), to tap off air from the compressor of a gas-turbine engine and to deliver the air into a hollow shaft of the engine to be conveyed through the shaft to the point or points of utilisation of the air for cooling or sealing purposes. In the specification above referred to, the air is tapped off through the compressor rotor structure into the main compressor shaft. A gas-turbine engine having air tapping means as above set forth will be referred to as "a gas-turbine engine as specified."

According to the present invention, a gas-turbine engine as specified comprises valve means rotating with the hollow shaft for controlling the flow of cooling air from the compressor. The valve means in one form of the invention is accommodated within the hollow shaft.

The valve means may be automatically controlled in accordance with engine rotational speed to prevent or reduce to a substantial extent the flow of air in a range of lower rotational speeds, the valve means being fully opened when the rotational speed rises out of this range. The valve means may be controlled either mechanically, as by a fly-bob mechanism within the shaft, or electrically, as by a solenoid supplied with energising current from externally of the shaft, or hydraulically, as by a ram supplied with operating pressure fluid from externally of the shaft. The valve means may be controlled either to be closed gradually as the speed falls into said range of rotational speeds, or to be closed at a particular value of the rotational speed. Alternatively closure of the valve means may be controlled manually.

Some embodiments of this invention will now be described with reference to the accompanying drawings, in which—

FIGURE 1 is a diagrammatic axial section through a gas-turbine engine,

FIGURES 2, 3 and 4 illustrate different forms of control for air tapping means.

Figure 2A:
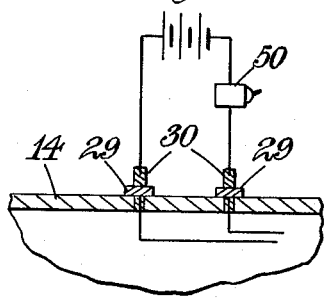
FIGURES 2a, 2b, 2c illustrate forms of control for the form of the invention illustrated in FIGURE 2.

Referring to FIGURE 1, the engine comprises an axial-flow compressor 10, combustion equipment 11 which receives compressed air from the compressor 10 and has fuel delivered into it to be burnt with the air, a turbine 12 receiving the gaseous products of combustion from the combustion equipment, and an exhaust assembly 13 through which exhaust gases flow on leaving the turbine 12.

The compressor rotor 10a is mounted on a hollow shaft 14 mounted in bearings 15a, 15b and the turbine rotor 12a is mounted on a hollow shaft 16 which is supported in a bearing 17 and is coupled at 18 to the shaft 14 so that the turbine rotor 12a drives the compressor rotor 10a.

Air is tapped off from an intermediate stage of the compressor 10 through duct structure 19 forming part of the compressor rotor 10a to be delivered through ports 20 into the compressor shaft 14, and this air is delivered through the shafts 14, 16 to cool various parts of the engine. For instance, in the engine illustrated, the air is delivered through ports 21 to cool bearing 15b, through ports 22 to cool bearing 17 and through ports 23 into ducts 24 in the turbine rotor 12a to cool its disc and blades.

This invention provides valve means 25 by which the flow of tapped air can be controlled, for instance to prevent or to reduce substantially tapping of air at low engine rotational speeds.

Referring now to FIGURES 2 to 4, there is shown three forms of such valve means 25 and in each case the valve means 25 comprises a piston valve 26 slidable within the shaft 14 to cover and uncover the ports 20, and operating means for the piston valve 26.

Figure 2B:
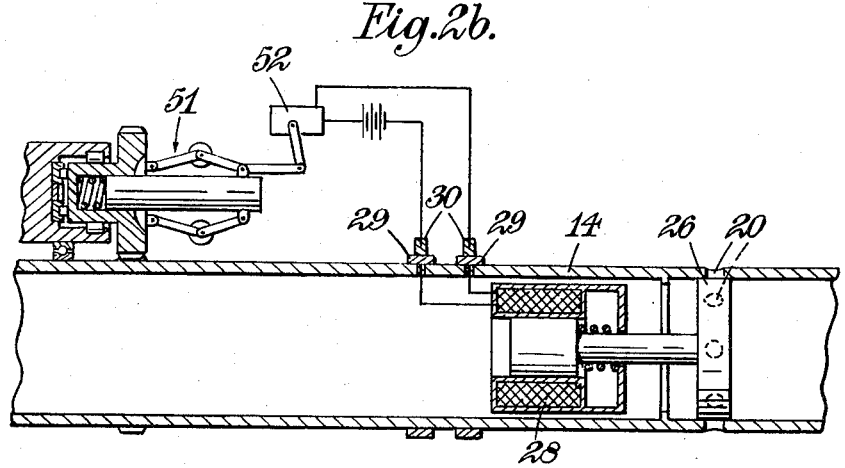
Figure 2C:
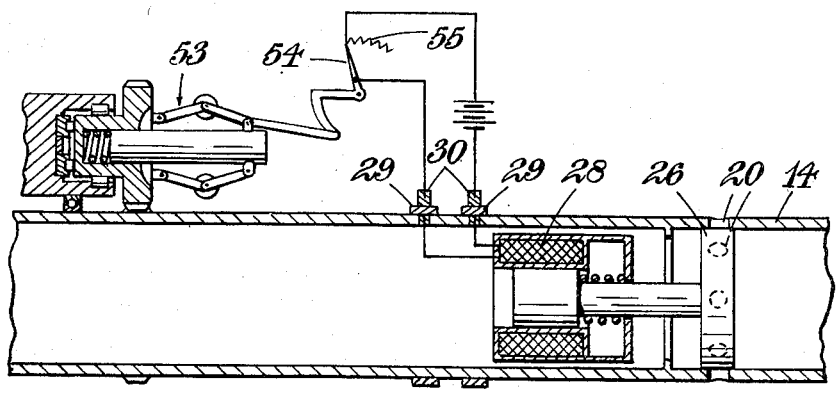

In FIGURE 2, the piston valve 26 is operated by being connected to the armature 27 of a solenoid 28, which is energised through slip rings 29 and brushes 30 from a suitable source of current. When the solenoid is deenergised, the piston valve 26 is held by a spring 31 against an internal shoulder 30 on the shaft to be clear of the ports 20, but, when the solenoid is energised, the piston valve 26 is moved to the right as seen in the drawing into a position in which the valve 26 covers the ports 20. The supply of electricity to the solenoid may be controlled manually (FIGURE 2a) as by manual switch 50, or automatically as by a speed-responsive means 51 operating switch 52 (FIGURE 2b) or by means (FIGURE 2c) to decrease the energising current gradually as the rotational speed increases so that the ports are fully uncovered at rotational speeds above a selected value. In FIGURE 2c speed-responsive means 53 operates the wiper arm 54 of a rheostat 55 to increase the effective resistance of the rheostat as the rotational speed increases.

In FIGURE 3, the piston valve 26 is controlled by a mechanical speed-responsive device housed in the shaft 14. The piston valve 26 is connected through links to fly-bobs 32 which, as the rotational speed of the shaft 14 increases, move outwards to draw the piston valve 26 to the left against the action of spring 33 and thereby to uncover the ports.

In FIGURE 4, the piston valve 26 is moved hydraulically by being connected to a ram piston 34 working in a ram cylinder 35 mounted coaxially within the shaft 14. The ram cylinder 35 is supplied at one end with pressure fluid to tend to urge the piston 34, and then the piston valve 26, to the right into a position in which the piston valve 26 covers the ports 20 and the ram piston 34 is loaded by a spring 36 in the opposite sense. The pressure fluid supply is taken from a pump 37 to a manifold 39 encircling the shaft and a conduit 40 leads within the shaft from the manifold 39 to the ram cylinder 35. A control valve 38 is provided in a by-pass around the pump. The pressure fluid supply valve 38 may be controlled manually or automatically.

In the construction of FIGUGRE 4, the skirt of the piston valve 26 has cut-aways 41 at angularly spaced points so that some of the ports 20, for instance alternate ports, are covered before the remainder. A similar arrangement may be used with the construction of FIGURES 2 and 3.

I claim:

1. In a gas-turbine engine, a compressor and a turbine in series flow arrangement, and shafting drivingly connecting the turbine and compressor; tapping means drawing air from said compressor, a flow path communicating with said tapping means and comprising a passage extending in said shafting and porting in the wall of the shafting in series flow arrangement, and means controlling the flow of air in said flow path from the tapping means comprising a valve member disposed within the passage of the shafting to co-operate with the porting and movable progressively within the passage between a first position in which the porting is at least partly closed and a second position in which the porting is open whereby the flow to the internal passages is progressively varied, and control means connected to be responsive to the rotational speed of the shafting and connected to operate said valve member, said control means being operative to move the valve member from said first position to the second position when the rotational speed of the shafting increases from a low speed range.

2. A gas turbine engine according to claim 1, wherein the valve member comprises a piston valve slidably accommodated within the shafting to slide between the first position in which the porting is covered and the second position in which the porting is uncovered.

3. A gas turbine engine according to claim 2, wherein the porting comprises a ring of angularly-spaced ports and the piston valve has angularly-spaced cut-aways to cooperate with a number of the ports as the valve moves towards the first position.

4. A gas turbine engine according to claim 2, comprising rotational speed responsive means mounted within the shafting and connected to the piston valve to move it from the second position towards the first position on increase of the rotatable speed of the shafting.

5. A gas turbine engine according to claim 2, comprising a fly-bob mechanism mounted within the shafting coaxially therewith, said fly-bob mechanism being connected to the piston valve to move it from the second position towards the first position on increase of the rotational speed of the shafting, and spring means urging the piston valve from the second position towards the first position.

6. A gas turbine engine according to claim 2, comprising a solenoid device mounted coaxially within the shafting and connected to the piston valve to move it between said positions, and means externally of the shafting supplying energising current to the solenoid device.

7. A gas turbine engine according to claim 2, said control means comprising a ram cylinder mounted co-axially within the shafting, a ram piston slidable in the cylinder and connected to the piston valve to move it between said positions, controllable fluid-pressure supply means disposed externally of the shafting and connected to the cylinder at one end and spring means urging the ram piston towards said send of the cylinder.

8. A gas turbine engine according to claim 1, comprising speed-responsive means responsive to the rotational speed of the shafting and connected to operate said valve member in the sense of uncovering the porting on increase of rotational speed and of covering the porting on decrease of rotational speed.

9. In a gas-turbine engine, a compressor, and a turbine in series flow arrangement, and shafting drivingly connecting the turbine and compressor; tapping means drawing air from said compressor, a flow path communicating with said tapping means and comprising a passage extending in said shafting and porting in the wall of the shafting in series flow arrangement, and means controlling the flow of air in said flow path from the tapping means comprising a valve member disposed within the passage of the shafting to cooperate with the porting and movable progressively within the passage between a first position in which the porting is at least partly closed and a second position in which the porting is open whereby the flow to the shafting passage is progressively varied, and control means comprising a ram cylinder mounted coaxially within the shafting, a ram piston slidable in the cylinder and connected to the piston valve to move it between said positions, controllable fluid-pressure supply means disposed externally of the shafting and connected to the cylinder at one end, spring means urging the ram piston towards said end of the cylinder and speed-responsive means responsive to the rotational speed of the shafting and connected to control said fluid pressure supply means in the sense to cause movement of the valve member from said first position to said second position when the rotational speed of the shafting increases from a low speed range.

10. A gas turbine engine according to claim 9, the porting comprising a ring of angularly-spaced ports and the said valve member being a piston valve slidable within the shafting, the piston valve member having angularly spaced cut aways to cooperate with a number of the said ports as the valve member moves towards the first position.

References Cited in the file of this patent

UNITED STATES PATENTS

| 2,485,514 | Sturrock | Oct. 18, 1949 |
| 2,588,140 | McFarland et al. | Mar. 4, 1952 |
| 2,592,938 | McNaught | Apr. 15, 1952 |
| 2,599,470 | Meyer | June 3, 1952 |
| 2,618,453 | Loos et al. | Nov. 18, 1952 |
| 2,636,665 | Lombard | Apr. 28, 1953 |
| 2,656,096 | Schwarz | Oct. 20, 1953 |
| 2,660,421 | Sorensen | Nov. 24, 1953 |
| 2,749,087 | Blackman et al. | June 5, 1956 |
| 2,830,751 | Quinn et al. | Apr. 15, 1958 |

FOREIGN PATENTS

| 24,453 | France | Mar. 28, 1922 |
| 736,503 | Great Britain | Sept. 7, 1955 |
| 2,852,917 | France | Sept. 23, 1958 |